(12) United States Patent
Chen et al.

(10) Patent No.: US 10,987,913 B2
(45) Date of Patent: *Apr. 27, 2021

(54) PAD REMOVAL DEVICE AND METHOD

(71) Applicant: TAIWAN SEMICONDUCTOR MANUFACTURING COMPANY, LTD., Hsinchu (TW)

(72) Inventors: ChunHung Chen, Youngjing (TW); Sheng-Chen Wang, Taichung (TW)

(73) Assignee: TAIWAN SEMICONDUCTOR MANUFACTURING COMPANY, LTD., Hsinchu (TW)

(*) Notice: Subject to any disclaimer, the term of this patent is extended or adjusted under 35 U.S.C. 154(b) by 0 days.

This patent is subject to a terminal disclaimer.

(21) Appl. No.: 16/392,809

(22) Filed: Apr. 24, 2019

(65) Prior Publication Data

US 2019/0248127 A1 Aug. 15, 2019

Related U.S. Application Data

(63) Continuation of application No. 15/488,958, filed on Apr. 17, 2017, now Pat. No. 10,272,661.

(51) Int. Cl.
*B32B 43/00* (2006.01)
*B32B 7/12* (2006.01)
*B32B 37/12* (2006.01)
*B24B 37/34* (2012.01)

(52) U.S. Cl.
CPC .......... *B32B 43/006* (2013.01); *B24B 37/34* (2013.01); *B32B 7/12* (2013.01); *B32B 37/12* (2013.01); *B32B 2307/538* (2013.01); *Y10T 156/1168* (2015.01); *Y10T 156/1978* (2015.01); *Y10T 156/1989* (2015.01)

(58) Field of Classification Search
CPC .............. B32B 43/006; Y10T 156/1168; Y10T 156/1978; Y10T 156/1989
See application file for complete search history.

(56) References Cited

U.S. PATENT DOCUMENTS

| | | | |
|---|---|---|---|
| 7,187,162 B2 | 3/2007 | Kerdiles et al. | |
| 8,701,734 B2 * | 4/2014 | Nakamura | H01L 21/67011 156/701 |
| 9,165,802 B2 * | 10/2015 | Young | H01L 21/67092 |
| 9,296,193 B2 | 3/2016 | Burggraf et al. | |
| 9,724,906 B2 | 8/2017 | Itou et al. | |
| 10,272,661 B2 * | 4/2019 | Chen | B32B 43/006 |
| 2016/0176181 A1 | 6/2016 | Kim | |
| 2016/0329235 A1 | 11/2016 | Fehkuhrer | |
| 2017/0077459 A1 | 3/2017 | Choi | |

* cited by examiner

*Primary Examiner* — Mark A Osele
(74) *Attorney, Agent, or Firm* — Hauptman Ham, LLP

(57) ABSTRACT

A pad removal device includes a pad guide extending along a first direction. The pad guide includes a first affixing component configured to affix a first end of the pad guide to a pad at a first pad edge location, and a second affixing component configured to affix a second end of the pad guide to the pad at a second pad edge location opposite the first pad edge location. The pad removal device further includes an actuator attached to the pad guide, and a control assembly coupled to the actuator and configured to cause the actuator to move the first end toward the second end along the first direction. The pad guide is configured to extend in a second direction different from the first direction by an amount dependent on a distance between the first end and the second end.

20 Claims, 6 Drawing Sheets

700

| Affix a first end of a pad guide to a first pad edge location and a second end of the pad guide to a second pad edge location. | ~710 |

↓

| Pull the first end toward the second end using an actuator. | ~720 |

↓

| Using the pad guide, in response to the pulling the first end toward the second end, pull each of the first pad edge location and the second pad edge location in a removal direction away from a pad center region. In some embodiments, control a speed at which the actuator pulls the first end toward the second end. | ~730 |

Fig. 7

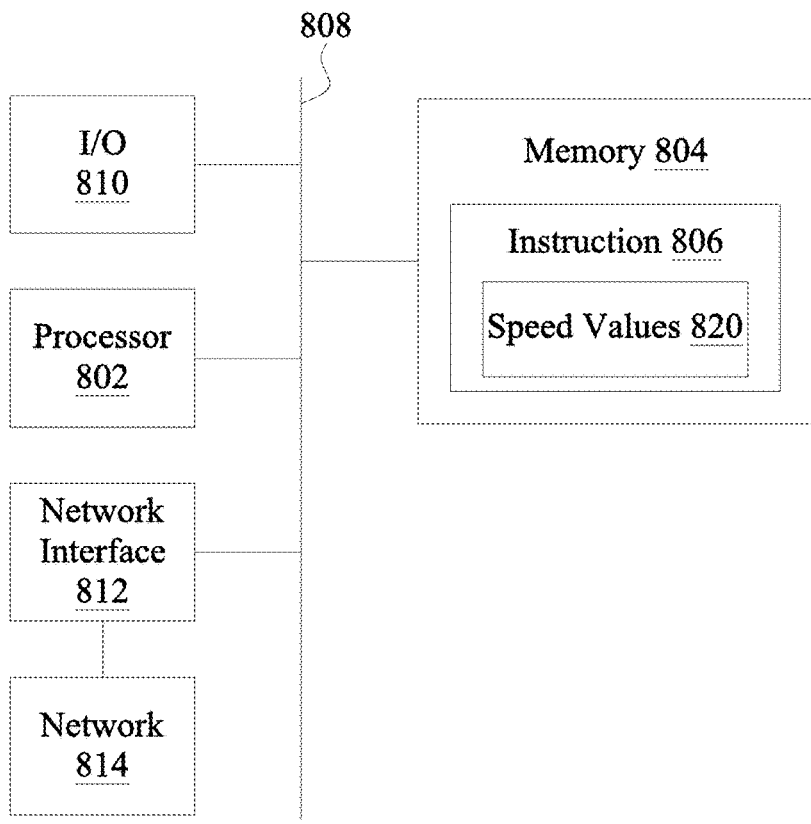

Fig. 8

PAD REMOVAL DEVICE AND METHOD

PRIORITY CLAIM

The present application is a continuation of U.S. application Ser. No. 15/488,958, filed Apr. 17, 2017, which is incorporated herein by reference in its entirety.

BACKGROUND

Integrated circuit (IC) manufacturing often includes chemical mechanical planarization (CMP) processing operations in which chemical slurries and polish heads are applied to IC wafers. To facilitate control of movement and pressure during such operations, a wafer is typically supported by a CMP pad bonded to a platen. After a CMP pad reaches its useful lifetime, it is separated from the platen and replaced.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 7 is a flowchart of a method of removing a pad, in accordance with some embodiments.

FIG. 8 is a schematic view of a system for controlling a pad removal device, in accordance with some embodiments.

DETAILED DESCRIPTION

Figure 1A:
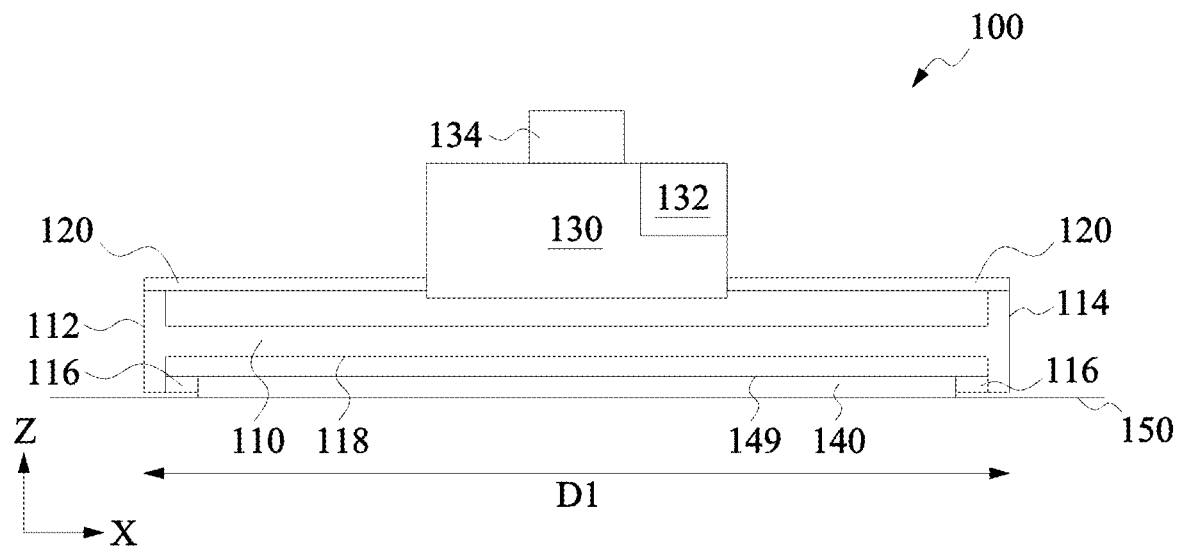
FIGS. 1A-1E are diagrams of one or more pad removal devices, in accordance with some embodiments.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In various embodiments, a pad removal device includes a pad guide having a first end and a second end along a first direction, at least one actuator attached to the first end, and a control assembly mechanically coupled to the actuator. The control assembly causes the actuator to pull the first end toward the second end along the first direction such that the first end moves toward the second end, and the pad guide is configured to extend in a second direction perpendicular to the first direction by an amount dependent on a distance between the first end and the second end. By affixing the first and second ends of the pad guide to pad edges, the pad edges are pulled in a direction away from a pad center location, thereby separating the pad from a surface to which it is bonded.

Figure 1B:
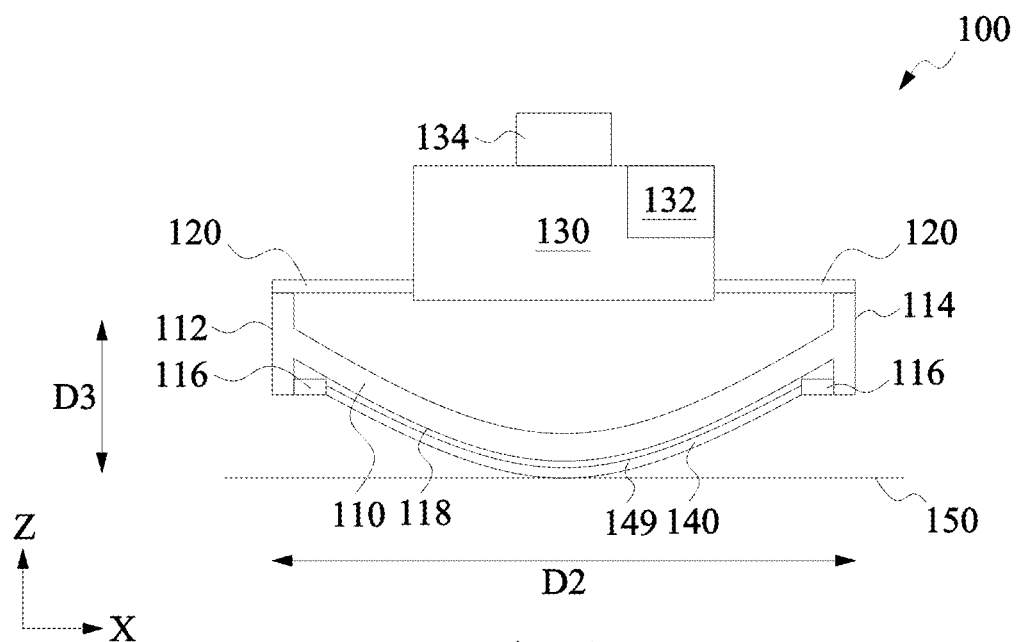

FIGS. 1A and 1B are diagrams of a pad removal device 100, in accordance with some embodiments. FIG. 1A is a diagram based on a side view of pad removal device 100 at a first position setting, and FIG. 1B is a diagram based on the side view of pad removal device 100 at a second position setting. In addition to pad removal device 100, FIGS. 1A and 1B depict a pad 140, a surface 150, a direction X, and a direction Z, perpendicular to direction X.

Pad removal device 100 includes a pad guide 110, actuators 120, and a control assembly 130. Pad guide 110 includes a first end 112 and a second end 114. A first actuator 120 extends from control assembly 130 to first end 112, and a second actuator 120 extends from control assembly 130 to second end 114.

In some embodiments, pad removal device 100 includes a single actuator 120 and one of actuators 120 is replaced by a support element (not shown). In some embodiments, pad removal device 100 includes a single actuator 120 and control assembly 130 is directly coupled to one of first end 112 or second end 114.

In some embodiments, pad removal device 100 includes one or more pad guides (not shown) in addition to pad guide 110. In some embodiments, pad removal device 100 includes one or more actuators (not shown) in addition to a first actuator 120 extending from control assembly 130 to first end 112 and a second actuator 120 extending from control assembly 130 to second end 114.

Pad guide 110 includes an affixing component 116 at first end 112, an affixing component 116 at second end 114, and a lower surface 118. As discussed below, affixing components 116 are configured to temporarily affix pad guide 110 to edges of pad 140.

In operation, with pad removal device 100 positioned on top of pad 140, at least a portion of lower surface 118 contacts an upper surface 149 of pad 140 for one or more position settings of pad removal device 100. As depicted in FIGS. 1A and 1B, at least a center portion of pad 140 is bonded to surface 150. In some embodiments, pad 140 is a CMP polishing pad. In some embodiments, surface 150 is a surface of a platen of a CMP processing system.

At the first position setting depicted in FIG. 1A, first end 112 and second end 114 define a distance D1 along direction X. Distance D1 corresponds to pad guide 110 being in a non-actuated state such that lower surface 118 aligns along direction X and does not have a significant component along direction Z.

At the second position setting depicted in FIG. 1B, first end 112 and second end 114 define a distance D2 along direction X. Distance D2 is less than distance D1 and corresponds to pad guide 110 being in an actuated state. In the actuated state, lower surface 118 deviates from alignment along direction X such that a significant component, distance D3, exists along direction Z. Distance D3 is defined by the displacement along direction Z of the lowermost portion of lower surface 118 from its non-actuated position to its actuated position in response to first end 112 and second end 114 being moved toward each other along direction X. Reduction of the distance between first and second ends 112, 114 causes pad guide 110 to bend or flex.

Pad guide 110 is a mechanical component or assembly capable of translating the displacement of first end 112 and second end 114 along direction X into the displacement of lower surface 118 along direction Z. Displacement of first end 112 and second end 114 along direction X includes displacement having a component in a direction in addition to direction X. The amount of the displacement of lower surface 118 along direction Z is dependent on the distance between first end 112 and second end 114. As the distance between first end 112 and second end 114 decreases, the amount of the displacement of lower surface 118 along direction Z increases.

In some embodiments, first end 112 and second end 114 are aligned above a longitudinal axis (not shown) of pad guide 110 so that, in operation, the displacement of lower surface 118 along direction Z is away from actuators 120 and control assembly 130. In some embodiments, a proximity of pad guide 110 to one or both of control assembly 130 and/or actuator 120 causes the displacement of lower surface 118 along direction Z to be away from actuators 120 and control assembly 130, in operation. In some embodiments, pad guide 110 is configured so that the displacement of lower surface 118 along direction Z is greatest at a center of lower surface 118.

By the configuration described above, in operation, pad guide 110 responds to decreasing separation between first end 112 and second end 114 along direction X by increasing a distance along direction Z between a center of pad 140 and edges of pad 140 at locations corresponding to affixing components 116. In operation, because pad 140 is initially bonded to surface 150, pad guide 110 acts to pull each of the pad edge locations away from a center pad region along direction Z in response to first end 112 being moved toward second end 114 along direction X and/or second end 114 being moved toward first end 112 along direction X.

Pad guide 110 includes a material having sufficient strength and stiffness to exert a force in direction Z capable of overcoming the bonding strength between pad 140 and surface 150. In various embodiments, pad guide 110 includes one or more of a metal such as stainless steel, a plastic such as polyetheretherketone (PEEK), or another sufficiently strong and stiff material. In some embodiments, pad guide 110 includes a material having one or more features of anti-corrosion, anti-deformation, or a non-stick surface.

In some embodiments, pad guide 110 includes a plurality of hinged plate segments such as pad guide 210, discussed below with respect to FIGS. 2A-2C. In some embodiments, pad guide 110 includes an elastic plate such as pad guide 310, discussed below with respect to FIGS. 3A-3C.

Each of first end 112 and second end 114 is a terminal portion of pad guide 110. In some embodiments, one or both of first end 112 or second end 114 includes affixing component 116. In some embodiments, affixing component 116 is a separate component or assembly attached to first end 112 and/or second end 114.

Each of first end 112 and second end 114 is configured to mechanically couple pad guide 110 to another component of pad removal device 100 such as actuator 120. In some embodiments, one or both of first end 112 or second end 114 is configured to removably couple pad guide 110 to another component of pad removal device 100. In some embodiments, one or both of first end 112 or second end 114 is configured to couple pad guide 110 to another component of pad removal device 100 on a continued basis, such as for a lifetime of pad guide 110 or actuator 120. In various embodiments, each of first end 112 and second end 114 includes one or more of a pin, a hook, a fastening device, an opening, or another configuration capable of mechanically coupling pad guide 110 to another component of pad removal device 100.

Affixing component 116 is a mechanical component or assembly capable of affixing first end 112 or second end 114 to an edge of pad 140 while exerting a force in direction Z capable of overcoming a bonding strength between pad 140 and surface 150.

In some embodiments, affixing component 116 is configured to temporarily affix first end 112 or second end 114 to an edge of pad 140. In some embodiments, affixing component 116 includes a clipper having a pair of arms and a spring such that, in operation, the arms are held in place on opposite sides of a pad edge by a force exerted by the spring. In some embodiments, affixing component 116 includes more than one clipper.

In some embodiments, affixing component 116 includes a clamping device or another component or assembly capable of gripping pad 140 so as to temporarily affix first end 112 or second end 114 to an edge of pad 140. In some embodiments, affixing component 116 includes a hook, needle, or another component or assembly capable of piercing pad 140 so as to temporarily affix first end 112 or second end 114 to an edge of pad 140.

In some embodiments, affixing component 116 is configured to be removable from pad guide 110 and to permanently affix first end 112 or second end 114 to an edge of pad 140. In some embodiments, affixing component 116 includes an adhesive device, a needle, or another component or assembly capable of permanently affixing a first end 112 or second end 114 to an edge of pad 140.

In the embodiment depicted in FIGS. 1A-1B, pad guide 110 includes two ends, first end 112 and second end 114. In some embodiments, such as the embodiment depicted in FIG. 1D, pad guide 110 includes ends in addition to first end 112 and second end 114.

Actuator 120 is a mechanical component or assembly capable of applying a force sufficient to pull, and thereby move, first end 112 toward second end 114 along direction X and/or second end 114 toward first end 112 along direction X responsive to control assembly 130. In various embodiments, actuator 120 includes one or more of a telescoping assembly, a wire, a moveable stage, a threaded or grooved arm, or another component or assembly capable of applying a force to first end 112 or second end 114.

In some embodiments, actuator 120 includes a telescoping arm such as a telescoping arm 420, discussed below with respect to FIG. 4. In some embodiments, actuator 120 includes a wire such as a wire 520, discussed below with respect to actuating assembly 500 and FIG. 5. In some embodiments, actuator 120 includes a moveable stage such as a moveable stage 620, discussed below with respect to actuating assembly 600 and FIG. 6.

Actuator 120 is configured to be coupled to control assembly 130 so as to respond to control assembly 130 by applying a force to first end 112 sufficient to pull, and thereby move, first end 112 toward second end 114 along direction X and/or applying a force to second end 114 sufficient to pull, and thereby move, second end 114 toward first end 112 along direction X. In some embodiments, actuator 120 is configured to be mechanically coupled to control assembly 130. In some embodiments, actuator 120 is configured to be electrically or communicatively coupled to control assembly 130. In some embodiments, actuator 120 is configured to respond to voltage levels or other signals from control assembly 130.

In some embodiments, actuator 120 includes a telescoping arm configured to respond to a screw or threaded device. In some embodiments, actuator 120 includes a telescoping arm configured to respond to a pneumatic device. In some embodiments, actuator 120 includes a wire configured to respond to a winding device. In some embodiments, actuator 120 includes a moveable stage configured to respond to a tracking device.

Actuator 120 is configured to be mechanically coupled to first end 112 and/or second end 114. In some embodiments, actuator 120 is configured to be removably coupled to first end 112 or second end 114. In some embodiments, actuator 120 is configured to be coupled to first end 112 or second end 114 on a continual basis, such as for a lifetime of pad guide 110 or actuator 120. In various embodiments, actuator 120 includes one or more of a pin, a hook, a fastening device, an opening, or another configuration capable of mechanically coupling to first end 112 or second end 114.

Control assembly 130 is a mechanical or electro-mechanical assembly capable of controlling actuator 120. In some embodiments, control assembly is capable of supporting actuator 120. In some embodiments, actuator 120 is supported by a component or assembly (not shown) other than control assembly. In some embodiments, control assembly 130 is configured to generate and/or output voltage levels or other signals to actuator 120. Control assembly 130 includes a user interface 132 and a carrier 134.

Control assembly 130 is configured to be mechanically coupled to actuator 120 so that at least a portion of actuator 120 has a fixed position relative to control assembly 130. In some embodiments, actuator 120 is a telescoping arm and control assembly 130 includes mounting hardware configured to fix a position of at least one section of the telescoping arm relative to control assembly 130. In some embodiments, actuator 120 is a wire and control assembly 130 includes a winding device configured to fix a position of at least a portion of the wire relative to control assembly 130. In some embodiments, actuator 120 is a moveable stage and control assembly 130 includes a tracking device configured to fix a position of the moveable stage relative to control assembly 130.

Control assembly 130 is configured to cause a first actuator 120 to pull first end 112 toward second end 114 along direction X and simultaneously cause a second actuator 120, if present, to pull second end 114 toward first end 112 along direction X. In some embodiments, control assembly 130 includes a screw device configured to control a length of a telescoping arm. In some embodiments, control assembly 130 includes a pneumatic device configured to control a length of a telescoping arm.

In some embodiments, control assembly 130 includes a winding device configured to control a length of a wire extending from the winding device. In some embodiments, control assembly 130 includes a winding device configured to control lengths of a plurality of wires extending from the winding device.

In some embodiments, control assembly 130 includes a tracking device configured to control a positioning of a moveable stage. In some embodiments, control assembly 130 includes a tracking device configured to control positioning of a plurality of moveable stages.

In some embodiments, control assembly 130 is configured to be directly mechanically coupled to one of first end 112 or second end 114. In some embodiments, control assembly 130 is configured to be mechanically coupled to a support element that is mechanically coupled to one of first end 112 or second end 114.

Control assembly 130 is configured to control a speed at which actuator 120 moves first end 112 and/or second end 114 along direction X. By controlling the speed at which actuator 120 moves first end 112 and/or second end 114 along direction X, control assembly 130, in operation, controls a speed at which pad guide 110 pulls pad edge locations away from the center pad region, and thereby the rate at which pad 140 is separated from surface 150.

In some embodiments, control assembly 130 is configured to control a direction and a rate at which at least one screw turns to effect mechanical control of actuator 120. In some embodiments, control assembly 130 is configured to control a direction and a rate at which air is moved to effect pneumatic control of actuator 120. In some embodiments, control assembly 130 is configured to control a direction and a rate at which at least one winding device turns to effect mechanical control of actuator 120. In some embodiments, control assembly 130 is configured to control a direction and a rate at which at least one tracking device moves to effect mechanical control of actuator 120.

In some embodiments, control assembly 130 includes a processor or other logic device capable of controlling the speed at which actuator 120 moves first end 112 and/or second end 114 along direction X. In some embodiments, control assembly 130 is configured to increase a rate at which actuator 120 moves first end 112 and/or second end 114 along direction X as the distance between first end 112 and second end 114 decreases.

In some embodiments, control assembly 130 is configured to control the speed at which actuator 120 moves first end 112 and/or second end 114 along direction X based on one or more predetermined values. In some embodiments, control assembly 130 is configured to control the speed at which actuator 120 moves first end 112 and/or second end 114 along direction X based on one or more values received as input from an external source.

User interface 132 is a mechanical, electrical, or electro-mechanical assembly capable of receiving input from a user and communicating the input with control assembly 130. In some embodiments, user interface 132 is configured to receive input directly from a user. In some embodiments, user interface 132 is configured to receive input in the form of electrical signals transmitted by one or more wires or wireless devices.

In various embodiments, user interface 132 includes one or more of a switch, a variable-speed controller, a connector, a plug, a receptacle, a wireless interface, or another assembly capable of receiving and communicating user input. In various embodiments, user input includes one or more indications of one or more of an on-off status, an actuation status, an actuation direction, a speed value or values, or another indication related to control of pad removal device 100.

Carrier 134 is a mechanical component or assembly configured to be usable to maintain control assembly 130 in one or more positions above surface 150. In some embodiments, carrier 134 is a handle configured to be gripped by a human operator of pad removal device 100. In some embodiments, carrier 134 is an interface configured to mechanically couple pad removal device 100 to an external mechanical component or assembly.

Figure 1C:
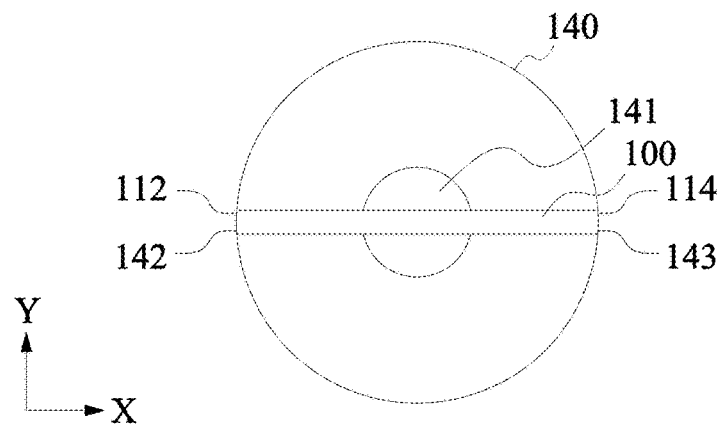
Figure 1D:
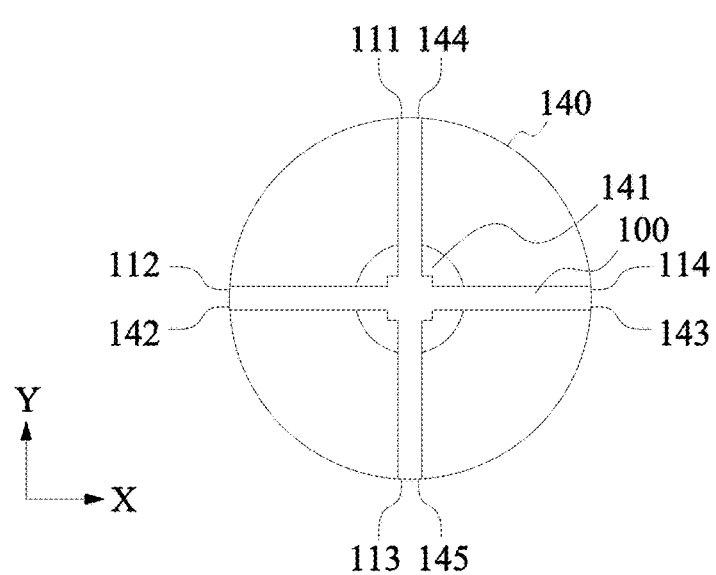
Figure 1E:
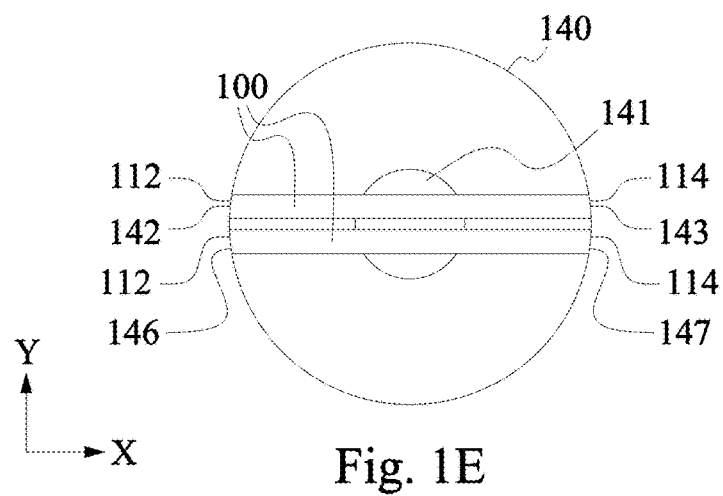

FIGS. 1C-1E are schematic diagrams of a top view of one or more pad removal devices 100, in accordance with some embodiments. FIGS. 1C-1E include one or more pad removal devices 100 and pad 140, discussed above with respect to FIGS. 1A-1B. In addition to one or more pad removal devices 100 and pad 140, FIGS. 1C-1E depict direction X, discussed above with respect to FIGS. 1A-1B, and a direction Y, perpendicular to directions X and Z.

In the embodiment depicted in FIG. 1C, a single pad removal device 100 is positioned across pad 140 and overlies a pad center region 141. First end 112 is affixed to pad 140 at a pad edge location 142, and second end 114 is affixed to pad 140 at a pad edge location 143.

In the embodiment depicted in FIG. 1D, a single pad removal device 100 including four actuators 120 is positioned across pad 140 and overlies pad center region 141. First end 112 is affixed to pad 140 at pad edge location 142, second end 114 is affixed to pad 140 at pad edge location 143, a third end 111 is affixed to pad 140 at a pad edge location 144, and a fourth end 113 is affixed to pad 140 at a pad edge location 145.

In the embodiment depicted in FIG. 1E, two pad removal devices 100 are positioned across pad 140. Each pad removal device 100 overlies pad center region 141. First end 112 of a first one of the two pad removal devices 100 is affixed to pad 140 at pad edge location 142, and second end 114 of the first one of the two pad removal devices 100 is affixed to pad 140 at pad edge location 143. First end 112 of a second one of the two pad removal devices 100 is affixed to pad 140 at a pad edge location 146, and second end 114 of the second one of the two pad removal devices 100 is affixed to pad 140 at a pad edge location 147. In some embodiments, more than two pad removal devices 100 are positioned across pad 140.

By the configuration described above, in operation, pad removal device 100 is usable to overcome the bonding strength between pad 140 and surface 150 more easily than with other devices that do not have the configuration of pad removal device 100. Pad removal device 100 thereby facilitates the removal of a pad from a surface, for example the removal of a CMP pad from the top surface of a platen. Compared to other approaches, pad removal device 100 enables easier and faster removal of a pad that is bonded to a surface.

Figure 2A:
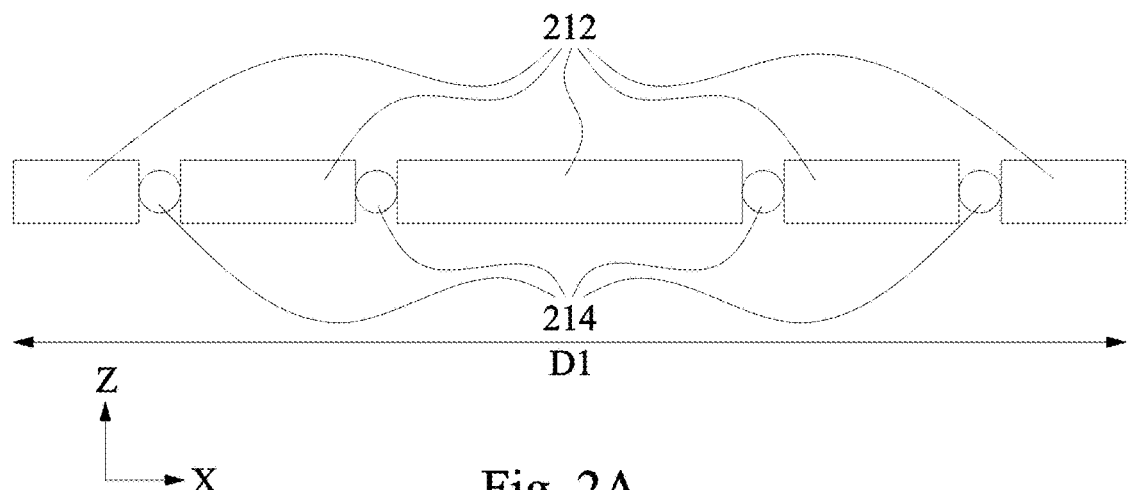
FIGS. 2A-2C are diagrams of a pad guide, in accordance with some embodiments.
Figure 2B:
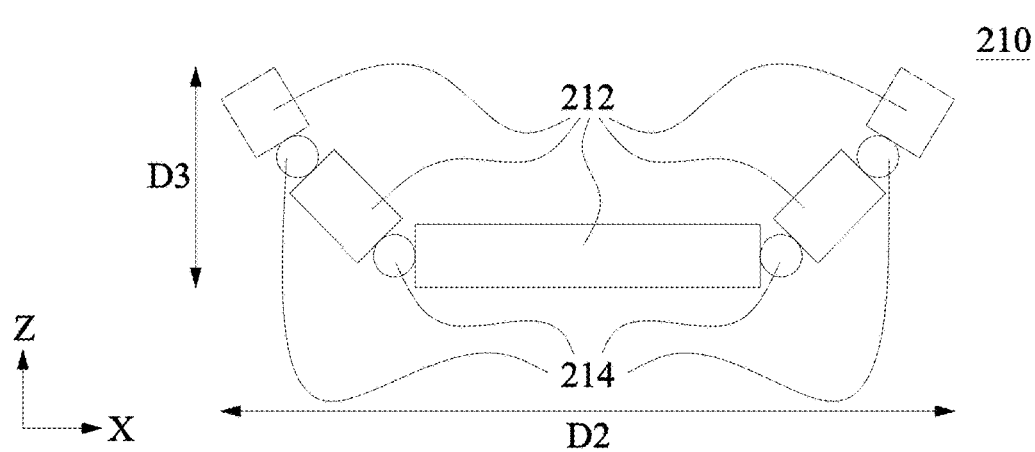
Figure 2C:
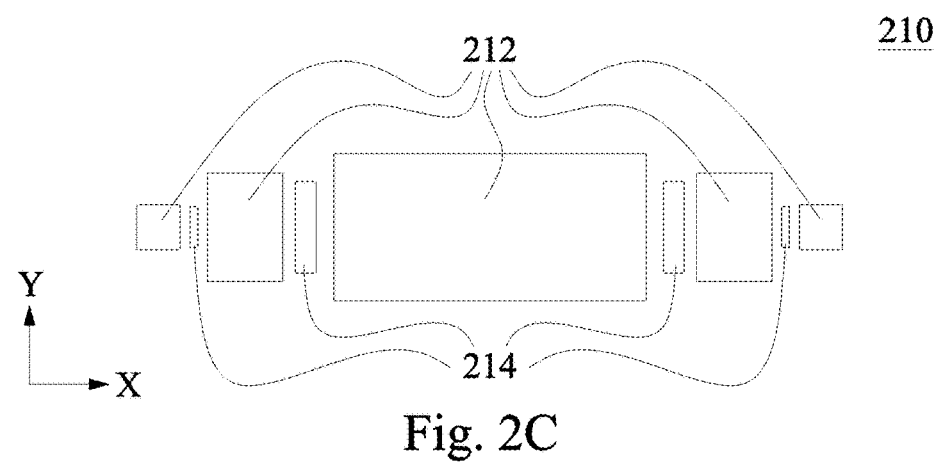

FIGS. 2A-2C are diagrams of a pad guide 210, in accordance with some embodiments. Pad guide 210 is usable as part or all of pad guide 110, discussed above with respect to pad removal device 100 and FIGS. 1A-1E.

FIG. 2A is a diagram based on a side view of pad guide 210 at a first position setting, FIG. 2B is a diagram based on the side view of pad guide 210 at a second position setting, and FIG. 2C is a top view of pad guide 210 at the first position setting. In addition to pad guide 210, FIGS. 2A-2C depict directions X, Y, and Z as discussed above with respect to FIGS. 1A-1E.

Pad guide 210 includes a plurality of plate segments 212 joined by a corresponding plurality of hinges 214. At the first position setting depicted in FIG. 2A, pad guide 210 is in a non-actuated state in which it extends distance D1 along direction X and does not have a significant component along direction Z. At the second position setting depicted in FIG. 2B, pad guide 210 is in an actuated state in which it extends distance D2 along direction X and distance D3 along direction Z.

Plurality of plate segments 212 and plurality of hinges 214 are configured so that, in operation, the decrease from distance D1 to distance D2 along direction X causes pad guide 210 to extend to distance D3 along direction Z based on at least one segment of plurality of plate segments 212 rotating about a corresponding hinge of plurality of hinges 214 relative to a second segment of plurality of plate segments 212.

In the embodiment depicted in FIGS. 2A and 2B, plurality of plate segments 212 has five hinged plate segments. In some embodiments, plurality of plate segments 212 has fewer than five segments. In some embodiments, plurality of plate segments 212 has more than five segments.

In the embodiment depicted in FIG. 2C, a middle segment of a plurality of plate segments 212 is wider along direction Y than the other segments of the plurality of plate segments 212, and the endmost segments of plurality of plate segments 212 are narrower along direction Y than the other segments of plurality of plate segments 212. In some embodiments, the segments of plurality of plate segments 212 have width relationships other than those of the embodiment depicted in FIG. 2C. In some embodiments, each segment of plurality of plate segments 212 has as a same width along direction Y.

Pad guide 210 includes one or more components or assemblies (not shown) at one or both ends configured to mechanically couple pad guide 210 to other components of a pad removal device such as pad removal device 100, discussed above with respect to FIGS. 1A-1E.

By the configuration described above, pad guide 210 is capable of translating the movement of first end 112 and second end 114 toward each other in direction X into movement along direction Z such that the benefits described above with respect to pad removal device 100 can be realized.

Figure 3A:
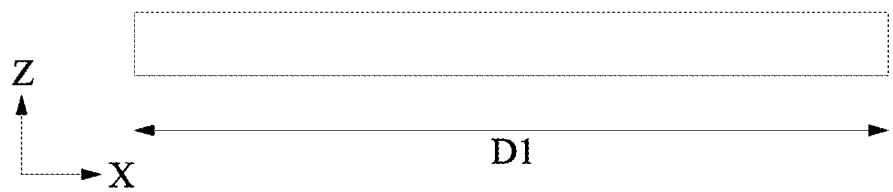
FIGS. 3A-3C are diagrams of a pad guide, in accordance with some embodiments.
Figure 3B:
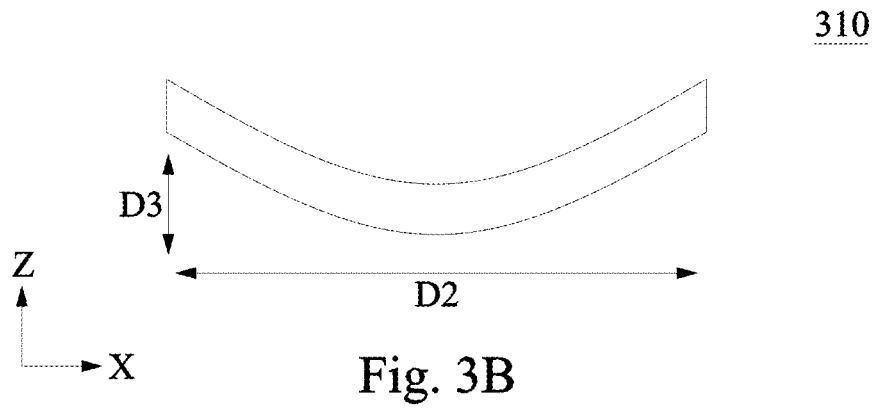
Figure 3C:
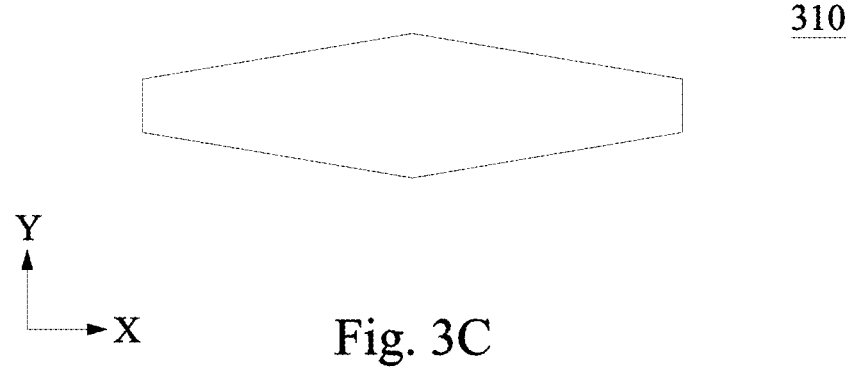

FIGS. 3A-3C are diagrams of a pad guide 310, in accordance with some embodiments. Pad guide 310 is usable as part or all of pad guide 110, discussed above with respect to pad removal device 100 and FIGS. 1A-1E.

FIG. 3A is a diagram based on a side view of pad guide 310 at a first position setting, FIG. 3B is a diagram based on the side view of pad guide 310 at a second position setting, and FIG. 3C is a top view of pad guide 310 at the first position setting. In addition to pad guide 310, FIGS. 3A-3C depict directions X, Y, and Z, discussed above with respect to FIGS. 1A-1E.

Pad guide 310 is a single elastic plate. At the first position setting depicted in FIG. 3A, pad guide 310 is in a non-actuated state in which it extends distance D1 along direction X and does not have a significant component along direction Z. At the second position setting depicted in FIG. 3B, pad guide 310 is in an actuated state in which it extends distance D2 along direction X and distance D3 along direction Z.

Pad guide 310 is configured so that, in operation, the decrease from distance D1 to distance D2 along direction X causes pad guide 310 to extend to distance D3 along direction Z based on a combination of elasticity and stiffness.

In the embodiment depicted in FIG. 3C, a middle portion of plurality of pad guide 310 is wider along direction Y than the other portions of pad guide 310, and the endmost portions of pad guide 310 are narrower along direction Y than the other portions of pad guide 310. In some embodiments, the portions of pad guide 310 have width relationships other than those of the embodiment depicted in FIG. 3C. In some embodiments, each portion of plurality of pad guide 310 has a same width along direction Y.

Pad guide 310 includes one or more components or assemblies (not shown) at one or both ends configured to mechanically couple pad guide 310 to other components of a pad removal device such as pad removal device 100, discussed above with respect to FIGS. 1A-1E.

By the configuration described above, pad guide 310 is capable of translating the movement of first end 112 and second end 114 toward each other in direction X into movement along direction Z such that the benefits described above with respect to pad removal device 100 can be realized.

Figure 4:
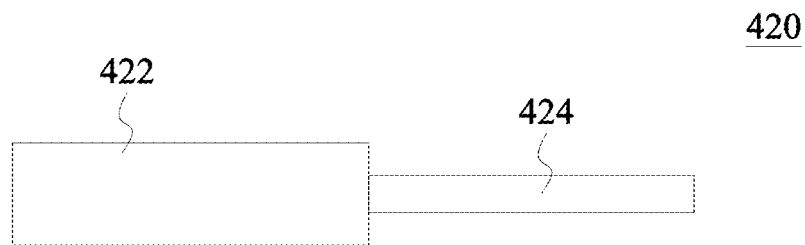
FIG. 4 is a schematic diagram of a telescoping arm, in accordance with some embodiments.

FIG. 4 is a schematic diagram of a telescoping arm 420, in accordance with some embodiments. Telescoping arm 420 is usable as part or all of actuator 120, discussed above with respect to pad removal device 100 and FIG. 1.

Telescoping arm 420 includes a first segment 422 and a second segment 424. First segment 422 is configured to allow a range of portions of second segment 424 to recede into first segment 422 such that an overall length of telescoping arm is variable.

In some embodiments, an overall length of telescoping arm 420 is capable of being reduced or extended in response to a screw device. In some embodiments, an overall length of telescoping arm 420 is capable of being reduced or extended in response to a pneumatic device.

In the embodiment depicted in FIG. 4, telescoping arm 420 has two segments. In some embodiments, telescoping arm 420 has more than two segments.

Telescoping arm 420 includes one or more components or assemblies (not shown) at one or both ends configured to mechanically couple telescoping arm 420 to other components of a pad removal device such as pad removal device 100, discussed above with respect to FIGS. 1A-1B.

By the configuration described above, telescoping arm 420 is capable of actuating the movement of first end 112 and/or second end 114 of pad guide 110 toward each other in direction X such that the benefits described above with respect to pad removal device 100 can be realized.

Figure 5:
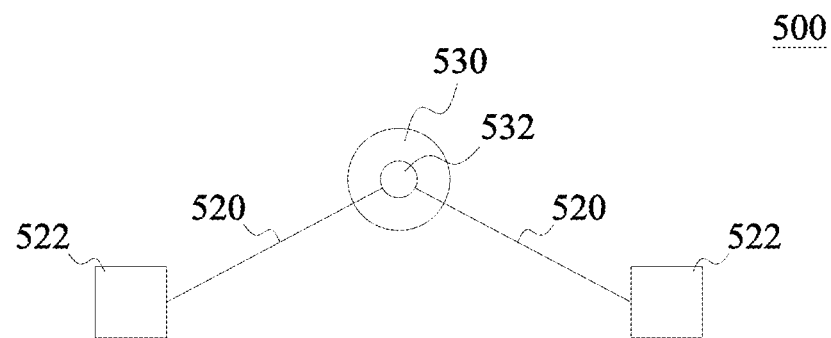
FIG. 5 is a schematic diagram of an actuating assembly, in accordance with some embodiments.

FIG. 5 is a schematic diagram of an actuating assembly 500, in accordance with some embodiments. Actuating assembly 500 includes wire 520 usable as part or all of actuator 120 and winding device 530 usable as part of control assembly 130, discussed above with respect to pad removal device 100 and FIGS. 1A-1E.

Wire 520 includes a metal or other similarly strong material and a coupling device 522 configured to mechanically couple wire 520 to a pad guide such as pad guide 110, discussed above with respect to pad removal device 100 and FIGS. 1A-1E, pad guide 210, discussed above with respect to FIGS. 2A-2C, or pad guide 310, discussed above with respect to FIGS. 3A-3C.

Winding device 530 includes one or more reels 532 configured to adjust, by rotation, a length of an extended portion of wire 520. In the embodiment depicted in FIG. 5, a single reel 532 is configured to adjust extended portions of two wires 520. In some embodiments, a single reel 532 is configured to adjust an extended portion of a single wire 520. In some embodiments, a single reel 532 is configured to adjust extended portions of more than two wires 520.

In the embodiment depicted in FIG. 5, winding device 530 includes a single reel 532. In some embodiments, winding device 530 includes reels (not shown) in addition to reel 532.

By the configuration described above, actuating assembly 500 is capable of actuating the movement of first end 112 and/or second end 114 of pad guide 110 toward each other in direction X such that the benefits described above with respect to pad removal device 100 can be realized.

Figure 6:
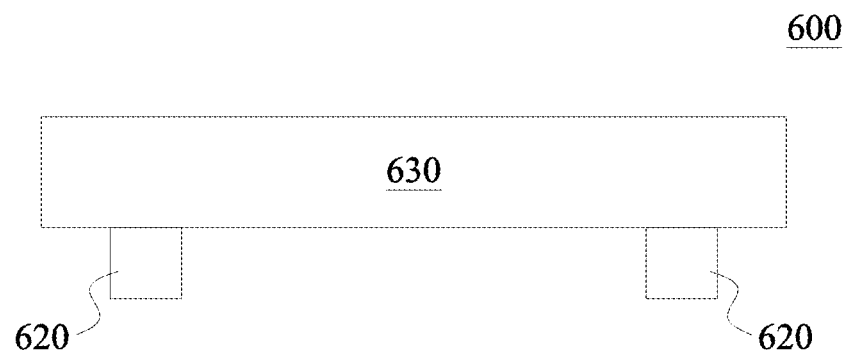
FIG. 6 is a schematic diagram of an actuating assembly, in accordance with some embodiments.

FIG. 6 is a schematic diagram of an actuating assembly 600, in accordance with some embodiments. Actuating assembly 600 includes moveable stages 620 usable as part or all of actuator 120 and tracking device 630 usable as part of control assembly 130, discussed above with respect to pad removal device 100 and FIGS. 1A-1E.

Moveable stages 620 are mechanical components or assemblies configured to be positioned by tracking device 630 while mechanically coupled to a pad guide such as pad guide 110, discussed above with respect to pad removal device 100 and FIGS. 1A-1E, pad guide 210, discussed above with respect to FIGS. 2A-2C, or pad guide 310, discussed above with respect to FIGS. 3A-3C.

In the embodiment depicted in FIG. 6, actuating assembly 600 includes two moveable stages 620. In some embodiments, actuating assembly 600 includes a single moveable stage 620. In some embodiments, actuating assembly 600 includes more than two moveable stages 620.

By the configuration described above, actuating assembly 600 is capable of actuating the movement of first end 112 and/or second end 114 of pad guide 110 toward each other in direction X such that the benefits described above with respect to pad removal device 100 can be realized.

FIG. 7 is a flowchart of a method 700 of removing a pad, in accordance with one or more embodiments. In some embodiments, method 700 is a method of removing a CMP pad from a surface of a platen. Method 700 is implemented using a pad removal device such as pad removal device 100, discussed above with respect to FIGS. 1A-1E.

The sequence in which the operations of method 700 are depicted in FIG. 7 is for illustration only; the operations of method 700 are capable of being executed in sequences that differ from that depicted in FIG. 7. In some embodiments, operations in addition to those depicted in FIG. 7 are performed before, between and/or after the operations depicted in FIG. 7.

At operation 710, a first end of a pad guide is affixed to a first pad edge location on the pad, and a second end of the pad guide is affixed to a second pad edge location on the pad. In some embodiments, affixing first and second ends of a pad guide includes affixing first end 112 and second end 114 of pad guide 110, discussed above with respect to pad removal device 100 and FIGS. 1A-1E. In some embodiments, affixing first and second ends of a pad guide includes affixing first and second ends of pad guide 210, discussed above with respect to FIGS. 2A-2C. In some embodiments, affixing first and second ends of a pad guide includes affixing first and second ends of pad guide 310, discussed above with respect to FIGS. 3A-3C.

In some embodiments, affixing first and second ends of a pad guide includes affixing one or both of first or second ends using clippers. In some embodiments, affixing first and second ends of a pad guide includes affixing one or both of first or second ends using affixing component 116, discussed above with respect to pad removal device 100 and FIGS. 1A-1E.

In some embodiments, affixing first and second ends of a pad guide includes affixing the first end to pad edge location 142 of pad 140 and the second end to pad edge location 143 of pad 140, discussed above with respect to FIGS. 1C-1E.

In some embodiments, operation 710 includes affixing a third end of the pad guide to a third pad edge location and affixing a fourth end of the second pad guide to a fourth pad edge location. In some embodiments, affixing third and fourth ends of the pad guide includes affixing the first end to pad edge location 144 of pad 140 and the second end to pad edge location 145 of pad 140, discussed above with respect to FIG. 1D.

In some embodiments, operation 710 includes affixing a first end of a second pad guide to a third pad edge location and affixing a second end of the second pad guide to a fourth pad edge location. In some embodiments, affixing first and second ends of a second pad guide includes affixing the first end to pad edge location 146 of pad 140 and the second end to pad edge location 147 of pad 140, discussed above with respect to FIG. 1E.

At operation 720, the first end is pulled toward the second end using an actuator. The first end is pulled toward the second end along a first direction. In some embodiments, operation 720 includes pulling the second end toward the first end with another actuator.

In some embodiments, at least one of pulling the first end toward the second end or pulling the second end toward the first end includes using actuator 120, discussed above with respect to pad removal device 100 and FIGS. 1A-1E. In some embodiments, at least one of pulling the first end toward the second end or pulling the second end toward the first end includes reducing a length of telescoping arm 420, discussed above with respect to FIG. 4.

In some embodiments, at least one of pulling the first end toward the second end or pulling the second end toward the first end includes using control assembly 130, discussed above with respect to pad removal device 100 and FIGS. 1A-1E. In some embodiments, at least one of pulling the first end toward the second end or pulling the second end toward the first end includes using wire 520 and winding device 530, discussed above with respect to actuating assembly 500 and FIG. 5. In some embodiments, at least one of pulling the first end toward the second end or pulling the second end toward the first end includes using moveable stage 620 and tracking device 630, discussed above with respect to actuating assembly 600 and FIG. 6.

In some embodiments, at least one of pulling the first end toward the second end or pulling the second end toward the first end includes pulling the first end toward the second end with a first actuator and pulling the second end toward the first end with a second actuator. In some embodiments, at least one of pulling the first end toward the second end or pulling the second end toward the first end includes at least one of pulling a third end toward a fourth end of the pad guide or pulling the fourth end toward the third end using at least one additional actuator. In some embodiments, at least one of pulling the first end toward the second end or pulling the second end toward the first end includes at least one of pulling a first end of a second pad guide toward a second end of the second pad guide or pulling the second end of the second pad guide toward the first end of the second pad guide using at least one additional actuator.

In some embodiments, at least one of pulling the first end toward the second end or pulling the second end toward the first end includes controlling a speed or speeds at which one or both of the first end is moved toward the second end or the second end is moved toward the first end. In some embodiments, at least one of pulling the first end toward the second end or pulling the second end toward the first end includes controlling a speed or speeds using a controller such as controller 802, discussed below with respect to system 800 and FIG. 8. Controlling the speed or speeds at which one or both of the first end is moved toward the second end or the second end is moved toward the first end controls a speed or speed at which one or more pad edge locations are pulled away from a surface, as discussed below. In some embodiments, pulling the first end and second end toward each other includes increasing the speed as a distance between the first end and the second end decreases.

In some embodiments, at least one of pulling the first end toward the second end or pulling the second end toward the first end includes controlling the speed using a screw device. In some embodiments, at least one of pulling the first end toward the second end or pulling the second end toward the first end includes controlling the speed using a pneumatic controller. In some embodiments, at least one of pulling the first end toward the second end or pulling the second end toward the first end includes controlling the speed using a winding device. In some embodiments, at least one of pulling the first end toward the second end or pulling the second end toward the first end includes controlling the speed using a tracking device.

In some embodiments, at least one of pulling the first end toward the second end or pulling the second end toward the first end includes controlling the speed based on one or more predetermined speed values. In some embodiments, at least one of pulling the first end toward the second end or pulling the second end toward the first end includes controlling the speed using one or more speed values based on user input.

At operation 730, using the pad guide, in response to the at least one of pulling the first end toward the second end or pulling the second end toward the first end, each of the first pad edge location and the second pad edge location is pulled in a second direction, also called a removal direction, away from a pad center region. In some embodiments, the second direction is perpendicular to the first direction.

In some embodiments, using the pad guide to pull each of the first pad edge location and the second pad edge location in the removal direction includes using pad guide 110, discussed above with respect to pad removal device 100 and FIGS. 1A-1E.

In some embodiments, using the pad guide to pull each of the first pad edge location and the second pad edge location in the removal direction includes rotating a first segment of a plurality of plate segments about a hinge relative to a second segment of the plurality of plate segments. In some embodiments, using the pad guide to pull each of the first pad edge location and the second pad edge location in the removal direction includes using pad guide 210, discussed above with respect to FIGS. 2A-2C.

In some embodiments, using the pad guide to pull each of the first pad edge location and the second pad edge location in the removal direction includes bending an elastic plate. In some embodiments, using the pad guide to pull each of the first pad edge location and the second pad edge location in the removal direction includes using pad guide 310, discussed above with respect to FIGS. 3A-3C.

In some embodiments, pulling each of the first pad edge location and the second pad edge location in the removal direction away from the pad center region includes pulling pad edge location 142 and pad edge location 143 away from pad center region 141 in direction Z, discussed above with respect to FIGS. 1C-1E. In some embodiments, pulling each of the first pad edge location and the second pad edge location in the removal direction away from the pad center region includes pulling pad edge location 144 and pad edge location 145 away from pad center region 141 in direction Z, discussed above with respect to FIG. 1D. In some embodiments, pulling each of the first pad edge location and the second pad edge location in the removal direction away from the pad center region includes pulling pad edge location 146 and pad edge location 147 away from pad center region 141 in direction Z, discussed above with respect to FIG. 1E.

By controlling the speed or speeds at which at least one first end of at least one pad guide is pulled toward at least one second end of the at least one pad guide, a speed or speeds at which at least first and second pad edge locations are pulled away from a pad center region is also controlled through the use of the pad guide. Method 700 thereby enables automated control of the forces applied to a pad during a pad removal process.

By executing the operation of method 700, the bonding strength between a pad and a surface is therefore overcome more easily than with other methods that do not include the operations of method 700. Method 700 thereby facilitates the removal of a pad from a surface, for example the removal of a CMP pad from the top surface of a platen. Compared to other approaches, method 700 enables easier and faster removal of a pad that is bonded to a surface.

FIG. 8 a schematic view of a system 800 for controlling a pad removal device, in accordance with some embodiments. System 800 includes a hardware processor 802 and a non-transitory, computer readable storage medium 804 encoded with, i.e., storing, the computer program instructions 86, i.e., a set of executable instructions. Instructions 806 include instructions for controlling a pad removal device. The processor 802 is electrically coupled to the computer readable storage medium 804 via a bus 808. The processor 802 is also electrically coupled to an I/O interface 810 by bus 808. A network interface 812 is also electrically connected to the processor 802 via bus 808. Network interface 812 is connected to a network 814, so that processor 802 and computer readable storage medium 804 are capable of connecting to external elements via network 814. In some embodiments, at least one of network interface 812 or network 814 is a component of user interface 132, discussed above with respect to pad removal device 100 and FIGS. 1A-1E. The processor 802 is configured to execute the computer program instructions 806 encoded in the computer readable storage medium 804 in order to cause system 800 to be usable for performing a portion or all of the operations as described in method 700.

In some embodiments, the processor 802 is a central processing unit (CPU), a multi-processor, a distributed processing system, an application specific integrated circuit (ASIC), and/or a suitable processing unit.

In some embodiments, the computer readable storage medium 804 is an electronic, magnetic, optical, electromagnetic, infrared, and/or a semiconductor system (or apparatus or device) for storing instructions and/or data in a non-transitory manner. For example, the computer readable storage medium 804 includes a semiconductor or solid-state memory, a magnetic tape, a removable computer diskette, a random access memory (RAM), a read-only memory (ROM), a rigid magnetic disk, and/or an optical disk. In some embodiments using optical disks, the computer readable storage medium 804 includes a compact disk-read only memory (CD-ROM), a compact disk-read/write (CD-R/W), and/or a digital video disc (DVD).

In some embodiments, the storage medium 804 stores the computer program code 806 configured to cause system 800 to perform a portion or all of method 700. In some embodiments, the storage medium 804 also stores information needed for performing method 800 as well as information generated during the performance of the method 800, such as speed values 820, and/or a set of executable instructions to perform the operation of method 700.

System 800 includes I/O interface 510. I/O interface 810 is coupled to external circuitry. In some embodiments, I/O interface 810 includes a keyboard, keypad, mouse, trackball, trackpad, and/or cursor direction keys for communicating information and/or commands to processor 802. In some embodiments, I/O interface 510 is a component of user interface 132, discussed above with respect to pad removal device 100 and FIGS. 1A-1E.

System 800 also includes network interface 812 coupled to the processor 802. Network interface 812 allows system 800 to communicate with network 814, to which one or more other computer systems are connected. Network interface 812 includes wireless network interfaces such as BLUETOOTH, WIFI, WIMAX, GPRS, or WCDMA; or wired network interface such as ETHERNET, USB, or IEEE-1394. In some embodiments, method 700 is implemented in two or more systems 800, and information such as speed values are exchanged between different systems 800 via network 814.

System 800 is configured to receive information related to pad removal operations. The information is transferred to processor 802 via bus 808 and is then stored in computer readable medium 804 as speed values 820. In some embodiments, the pad removal operations are accessed in operation 730 (FIG. 7).

By being configured to execute a portion or all of method 700, system 800 enables the realization of the advantages discussed above with respect to pad removal device 100, method 700, and FIGS. 1A-1E and 7.

One aspect of this description relates to a pad removal device. The pad removal device includes a pad guide extending along a first direction. The pad guide includes a first affixing component configured to affix a first end of the pad guide to a pad at a first pad edge location, and a second affixing component configured to affix a second end of the pad guide to the pad at a second pad edge location opposite the first pad edge location. The pad removal device further includes an actuator attached to the pad guide and a control assembly coupled to the actuator, the control assembly configured to cause the actuator to move the first end toward the second end along the first direction. The pad guide is configured to extend in a second direction different from the first direction by an amount dependent on a distance between the first end and the second end. In some embodiments, the second direction is perpendicular to the first direction. In some embodiments, the pad guide comprises a plurality of plate segments joined by hinges. In some embodiments, each endmost segment of the plurality of plate segments has a width less than a width of at least one inner segment of the plurality of plate segments. In some embodiments, a middle segment of the plurality of plate segments has a width wider than other segments of the plurality of plate segments. In some embodiments, each segment of the plurality of plate segments has a same width. In some embodiments, the pad guide includes a single elastic plate. In some embodiments, at least one of the first affixing component or the second affixing component includes a clipper, a hook, or a needle. In some embodiments, the first affixing component is configured to affix the first end of the pad guide to opposite sides of the pad at the first pad edge location, and the second affixing component is configured to affix the second end of the pad guide to opposite sides of the pad at the second pad edge location. In some embodiments, the actuator includes a first telescoping arm attached to the first end of the pad guide and a second telescoping arm attached to the second end of the pad guide. In some embodiments, the actuator includes a wire attached to the first end and the second end of the pad guide, and the control assembly comprises a winding device configured to adjust a length of the wire.

Another aspect of this description relates to a pad removal device. The pad guide includes a first end configured to affix to a pad at a first pad edge location, a second end configured to affix to the pad at a second pad edge location, a third end configured to affix to the pad at a third pad edge location, and a fourth end configured to affix to the pad at a fourth pad edge location. The pad removal device further includes a plurality of actuators. Each actuator of the plurality of actuators is attached to a corresponding one of the first end, the second end, the third end, and the fourth end of the pad guide. In some embodiments, the plurality of actuators includes a first actuator attached to the first end of the pad guide, a second actuator attached to the second end of the pad guide, a third actuator attached to the third end of the pad guide, and a fourth actuator attached to the fourth end of the pad guide. In some embodiments, the second pad edge location is opposite the first pad edge location, and the fourth pad edge location is opposite the third pad edge location. In some embodiments, the pad removal device further includes a first affixing component configured to affix the first end of the pad guide to opposite sides of pad at the first pad edge location, a second affixing component configured to affix the second end of the pad guide to opposite sides of the pad at the second pad edge location, a third affixing component configured to affix the third end of the pad guide to opposite sides of the pad at the third pad edge location, and a fourth affixing component configured to affix the fourth end of the pad guide to opposite sides of the pad at the fourth pad edge location. In some embodiments, the pad removal device further includes a control assembly coupled to the plurality of actuators. The control assembly is configured to cause at least one actuator of the plurality of actuators to move the first end of the pad guide toward the second end of the pad guide along a first direction, and cause at least another actuator of the plurality of actuators to move the third end of the pad guide toward the fourth end of the pad guide along a second direction different from the first direction. In some embodiments, the second direction is perpendicular to the first direction.

Still another aspect of this description relates to a pad removal device. The pad removal device includes a pad guide having a first end configured to affix to a pad at opposite sides of the pad at a first pad edge location, a second end configured to affix to the pad at opposite sides of the pad at a second pad edge location, a third end configured to affix to the pad at opposite sides of the pad at a third pad edge location, and a fourth end configured to affix to the pad at opposite sides of the pad at a fourth pad edge location. The pad removal device further includes at least one first actuator attached to the first and second ends of the pad guide, at least one second actuator attached to the third and fourth ends of the pad guide, and a control assembly coupled to the at least one first actuator and the at least one second actuator. The control assembly is configured to cause the at least one first actuator to move the first end of the pad guide toward the second end of the pad guide along a first direction, and cause the at least one second actuator to move the third end of the pad guide toward the fourth end of the pad guide along a second direction different from the first direction. In some embodiments, the second direction is perpendicular to the first direction. In some embodiments, the control assembly is configured to control a speed at which the at least one first actuator moves the first end toward the second end, and to control a speed at which the at least one second actuator moves the third end toward the fourth end.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A pad removal device comprising:
 a pad guide extending along a first direction, wherein the pad guide comprises:
  a first affixing component configured to affix a first end of the pad guide to a pad at a first pad edge location, and
  a second affixing component configured to affix a second end of the pad guide to the pad at a second pad edge location opposite the first pad edge location, wherein a central portion of the pad guide between the first affixing component and the second affixing component is free of any affixing components;
 an actuator attached to the pad guide; and
 a control assembly coupled to the actuator, the control assembly configured to cause the actuator to move the first end toward the second end along the first direction, wherein the pad guide is configured to extend in a second direction perpendicular to the first direction by an amount dependent on a distance between the first end and the second end.

2. The pad removal device of claim 1, wherein the first affixing component extends from the first end toward the second end in the first direction.

3. The pad removal device of claim 1, wherein the pad guide comprises a plurality of plate segments joined by hinges.

4. The pad removal device of claim 3, wherein each endmost segment of the plurality of plate segments has a width less than a width of at least one inner segment of the plurality of plate segments.

5. The pad removal device of claim 3, wherein a middle segment of the plurality of plate segments has a width wider than other segments of the plurality of plate segments.

6. The pad removal device of claim 3, wherein each segment of the plurality of plate segments has a same width.

7. The pad removal device of claim 1, wherein the pad guide comprises a single elastic plate.

8. The pad removal device of claim 1, wherein at least one of the first affixing component or the second affixing component comprises a clipper, a hook, or a needle.

9. The pad removal device of claim 1, wherein at least one of the first affixing component or the second affixing component comprises a clipper.

10. The pad removal device of claim 1, wherein the actuator comprises a first telescoping arm attached to the first end of the pad guide and a second telescoping arm attached to the second end of the pad guide.

11. The pad removal device of claim 1, wherein the actuator comprises a wire attached to the first end and the second end of the pad guide, and the control assembly comprises a winding device configured to adjust a length of the wire.

12. A pad removal device comprising:
a pad guide, wherein the pad guide comprises:
  a first end configured to affix to a pad at a first pad edge location,
  a second end configured to affix to the pad at a second pad edge location,
  a third end configured to affix to the pad at a third pad edge location, and
  a fourth end configured to affix to the pad at a fourth pad edge location; and
a plurality of actuators, wherein each actuator of the plurality of actuators is attached to a corresponding one of the first end, the second end, the third end, and the fourth end of the pad guide, a first actuator of the plurality of actuators is configured to move the first end from a first position a first distance from the second end to a second position a second distance from the second end, the first distance is greater than a width of the pad, and the second distance is less than the width of the pad.

13. The pad removal device of claim 12, wherein the plurality of actuators comprises the first actuator attached to the first end of the pad guide, a second actuator attached to the second end of the pad guide, a third actuator attached to the third end of the pad guide, and a fourth actuator attached to the fourth end of the pad guide.

14. The pad removal device of claim 12, wherein the second pad edge location is opposite the first pad edge location, and the fourth pad edge location is opposite the third pad edge location.

15. The pad removal device of claim 12, further comprising:
a first affixing component configured to affix the first end of the pad guide to opposite sides of pad at the first pad edge location,
a second affixing component configured to affix the second end of the pad guide to opposite sides of the pad at the second pad edge location,
a third affixing component configured to affix the third end of the pad guide to opposite sides of the pad at the third pad edge location, and
a fourth affixing component configured to affix the fourth end of the pad guide to opposite sides of the pad at the fourth pad edge location.

16. The pad removal device of claim 12, further comprising:
a control assembly coupled to the plurality of actuators, wherein the control assembly is configured to cause the first actuator of the plurality of actuators to move the first end of the pad guide toward the second end of the pad guide along a first direction, and cause at least one actuator of the plurality of actuators to move the third end of the pad guide toward the fourth end of the pad guide along a second direction different from the first direction.

17. The pad removal device of claim 16, wherein the second direction is perpendicular to the first direction.

18. A pad removal device, comprising:
a pad guide, wherein the pad guide comprises:
  a first end configured to affix to a pad at opposite sides of the pad at a first pad edge location,
  a second end configured to affix to the pad at opposite sides of the pad at a second pad edge location,
  a third end configured to affix to the pad at opposite sides of the pad at a third pad edge location, and
  a fourth end configured to affix to the pad at opposite sides of the pad at a fourth pad edge location;
at least one first actuator attached to the first and second ends of the pad guide;
at least one second actuator attached to the third and fourth ends of the pad guide; and
a control assembly coupled to the at least one first actuator and the at least one second actuator, wherein the control assembly is configured to cause the at least one first actuator to move the first end of the pad guide toward the second end of the pad guide along a first direction so that a distance between the first end and the second end is less than a width of the pad, cause the at least one second actuator to move the third end of the pad guide toward the fourth end of the pad guide along a second direction, and to control a speed at which the at least one first actuator moves the first end toward the second end.

19. The pad removal device of claim 18, wherein the second direction is perpendicular to the first direction.

20. The pad removal device of claim 18, wherein the control assembly is configured to control a speed at which the at least one second actuator moves the third end toward the fourth end.

* * * * *